United States Patent
Sutardja

(10) Patent No.: US 7,421,602 B2
(45) Date of Patent: Sep. 2, 2008

(54) COMPUTER WITH LOW-POWER SECONDARY PROCESSOR AND SECONDARY DISPLAY

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 391 days.

(21) Appl. No.: 10/779,544

(22) Filed: Feb. 13, 2004

(65) Prior Publication Data

US 2005/0182980 A1    Aug. 18, 2005

(51) Int. Cl.
*G06F 1/32* (2006.01)

(52) U.S. Cl. ............... 713/324; 713/300; 713/323

(58) Field of Classification Search ............ 713/300, 713/320, 322–324
See application file for complete search history.

(56) References Cited

U.S. PATENT DOCUMENTS

| | | | |
|---|---|---|---|
| 5,768,164 | A | 6/1998 | Hollon, Jr. |
| 2002/0129288 | A1* | 9/2002 | Loh et al. ............ 713/320 |
| 2003/0100963 | A1* | 5/2003 | Potts et al. ............ 700/83 |
| 2004/0225901 | A1* | 11/2004 | Bear et al. ............ 713/300 |
| 2005/0064911 | A1* | 3/2005 | Chen et al. ............ 455/566 |
| 2005/0066209 | A1* | 3/2005 | Kee et al. ............ 713/323 |
| 2006/0007051 | A1* | 1/2006 | Bear et al. ............ 345/1.1 |
| 2006/0129861 | A1* | 6/2006 | Kee et al. ............ 713/323 |

FOREIGN PATENT DOCUMENTS

CN     1550951     12/2004

OTHER PUBLICATIONS

ANSI/IEEE Std. 802.11, 1999 Edition; Part 11: Wireless LAN Medium Access Cntrol (MAC) and Physical Layer (PHY) Specifications; Information technology—Telecommunications and information exchange between systems—Local and metropolitan area networks—Specific requirements; pp. 1-512.
IEEE P802.11g/D8.2 Apr. 2003 (Supplement to ANSI/IEEE std. 802.11 1999(Reaff 2003)) Draft Supplement Standard for Part 11: Wireless LAN Medium Access Cntrol (MAC) and Physical Layer (PHY) Specifications; Information technology—Telecommunications and information exchange between systems—Local and metropolitan area networks—Specific requirements; Further Higher Data Rate Extension in the 2.4 GHz Band; pp. 1-69.

(Continued)

*Primary Examiner*—Dennis M Butler

(57) ABSTRACT

A computer includes a primary processor, a primary memory, and a primary input/output (I/O) interface that communicates with the primary processor and the primary memory. A primary display communicates with the primary I/O interface. The primary processor, the primary memory, and the primary display are operated in active and inactive modes and are powered down when the computer is in the inactive mode. A secondary processor dissipates less power than the primary processor. A secondary display communicates with the secondary processor. The secondary processor and the secondary display are powered up when the computer is in the inactive mode. The secondary processor and display support PDA-like functionality when the computer is in the inactive mode.

95 Claims, 11 Drawing Sheets

OTHER PUBLICATIONS

IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-83.

IEEE Std. 802.11b; Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications: Higher-Speed Physical Layer Extension in the 2.4 GHz Band; Approved Sep. 16, 1999; pp. 1-89.

IEEE Std. 802.11b-1999/Cor 1-2001;IEEE Standard for Information technology—Telecommunications and information exchange between systems—Local and metropolitan area networks—Specific requirements; Part 11: Wireless LAN Medium Access Cntrol (MAC) and Physical Layer (PHY) Specifications; Amendment 2: Higher-speed Physical Layer (PHY) extension in the 2.4 GHz band—Corrigendum 1; pp. 1-15.

IEEE Std. 802.16; IEEE Standard for Local and metropolitan area networks; Part 16: Aire Interface for Fixed Broadband Wireless Access Systems; Apr. 8. 2002; pp. 1-322.

IEEE Std. 802.16a; IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; Apr. 1, 2003; pp. 1-292.

Dean Takahashi; "PortalPlayer Takes A Leap", The Mercury News, Mar. 14, 2006, 3 pages.

Notification of First Office Action from the State Intellectual Property Office of PRC dated Aug. 24, 2007 for Chinese Application No. 200510007529.7; 14 pages.

* cited by examiner

COMPUTER WITH LOW-POWER SECONDARY PROCESSOR AND SECONDARY DISPLAY

FIELD OF THE INVENTION

The present invention relates to laptop and desktop computer architectures, and more particularly to laptop and desktop computer architectures having low-power secondary processors and secondary displays for providing reduced functionality when the laptop and desktop computers are in an inactive mode.

BACKGROUND OF THE INVENTION

Referring now to FIG. 1, a typical computer architecture for a laptop or desktop computer 10 is shown. The computer 10 includes an input/output (I/O) interface 12 that communicates with one or more peripheral devices 13. The memory 16 stores data and includes random access memory (RAM), read-only memory (ROM), Flash memory, and/or any other type of electronic data storage. The memory 16 communicates with a processor, memory and graphics hub 18. The hub 18, in turn, communicates with the I/O interface 12. A processor 20 also communicates with the processor, memory and graphics hub 18 and performs data processing, calculations, and other tasks. A graphics card and/or chip 24 may be provided to accelerate graphics processing. In some implementations, the processor, memory and graphics hub 18 and/or the graphics card and/or chip 24 are omitted and/or are integrated with other components.

The computer 10 further includes a display 30, which is typically a color display. A disk drive system 34 typically includes a magnetic storage medium that stores data. The disk drive system 34 may include a hard disk controller (HDC), an embedded processor, and/or other components (not shown). One or more input/output (I/O) devices 36 such as a keyboard, a mouse, a touch pad, a scratch pad and/or other pointing and/or input devices facilitate data input, navigation and/or user interaction with the computer. A wireless network interface 38 enables wireless connectivity with a wireless network such as a wide area network, a local area network, a cellular network such as CDMA, GSM, GSM3G, GPRS systems or other cellular networks, a Bluetooth network, or any other wireless network type. For example, the wireless network interface 38 may be compliant with IEEE Section 802.11, 802.11a, 802.11b, 802.11g, and/or 802.16.

Referring now to FIG. 2, when a laptop user travels with a laptop 50, the laptop 50 may pass through hot zones 54-1 and 54-2 (collectively hot zones 54). Access points 56-1 and 56-2 (collectively access points 56) provide wireless network connectivity to a distributed communications system 58 such as the Internet in the hot zones 54-1 and 54-2, respectively. Similarly, a home zone 60 may include an access point 62 that also provides wireless access to the distributed communication system 58.

Unless the laptop 50 is turned on and booted up, the user is not able to determine whether he or she has entered a hot zone 54. As can be appreciated, booting up the laptop 50 to determine whether a hot zone 54 is available is a time-consuming process. Likewise, when the laptop user wants to check e-mail, to check securities quotes, to trade securities and/or to use other Internet services, the laptop user must boot up the laptop 50.

SUMMARY OF THE INVENTION

A computer according to the present invention includes a primary processor, a primary memory, and a primary input/output (I/O) interface that communicates with the primary processor and the primary memory. A primary display communicates with the primary I/O interface. The primary processor, the primary memory, and the primary display are operated in active and inactive modes and are powered down when the computer is in the inactive mode. A secondary processor dissipates less power than the primary processor. A secondary display communicates with the secondary processor. The secondary processor and the secondary display are powered up when the computer is in the inactive mode.

In other features, a secondary memory communicates with the secondary processor, is powered up when the computer is in the inactive mode and has a lower storage capacity than the primary memory. The secondary processor and the secondary display support Personal Digital Assistant-like functions while the computer is in the inactive mode. The computer is a laptop and the secondary display is integrated with an outer surface of the laptop.

In other features, a disk drive system communicates with the primary I/O interface. The secondary processor and the secondary memory are integrated with the disk drive system.

In still other features, a wireless network interface communicates with the primary I/O interface. The secondary processor and the secondary memory are integrated with the wireless network interface. A secondary I/O device communicates with the secondary processor. The secondary display supports touch pad operation. The computer is a desktop computer that includes an enclosure. The secondary display is integrated with the enclosure.

In other features, a system comprises the computer and further comprises a wireless network interface that communicates with the secondary processor. A distributed communications system communicates with the wireless network interface. A server communicates with the distributed communications system. An agent module is executed by the secondary processor and retrieves at least one of e-mail messages and securities data from the server.

In still other features, a hot zone module is executed by the secondary processor, identifies when the computer is in a hot zone, and provides a visual indication of the hot zone on the secondary display.

A computer according to the present invention has active and inactive modes and includes a secondary processor and a secondary display that communicates with the secondary processor. The secondary processor and the secondary display are powered when the computer is in the inactive mode and support Personal Digital Assistant-like functions while the computer is in the inactive mode.

In other features, a secondary memory communicates with the secondary processor and is powered when the computer is in the inactive mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
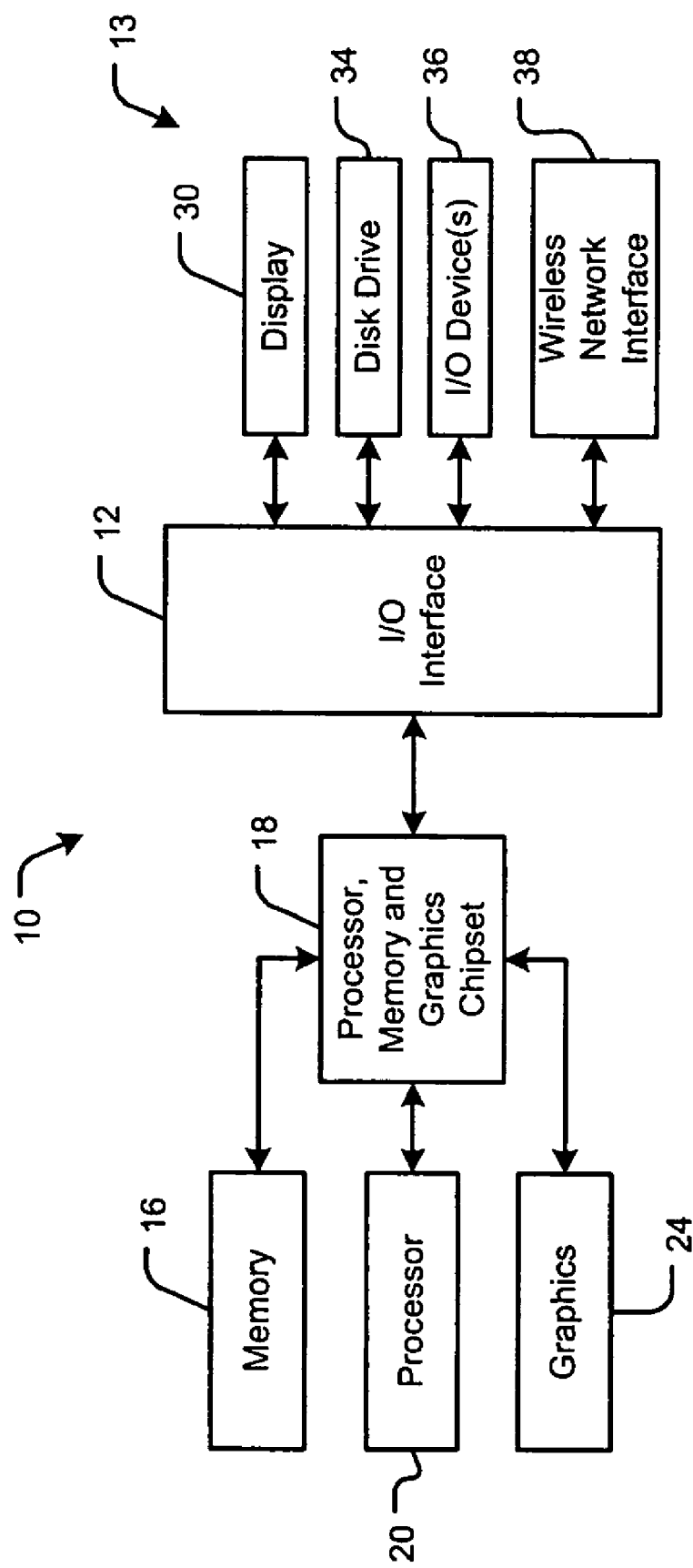
FIG. 1 is a functional block diagram of an exemplary computer architecture for laptop and desktop computers according to the prior art.
Figure 2:
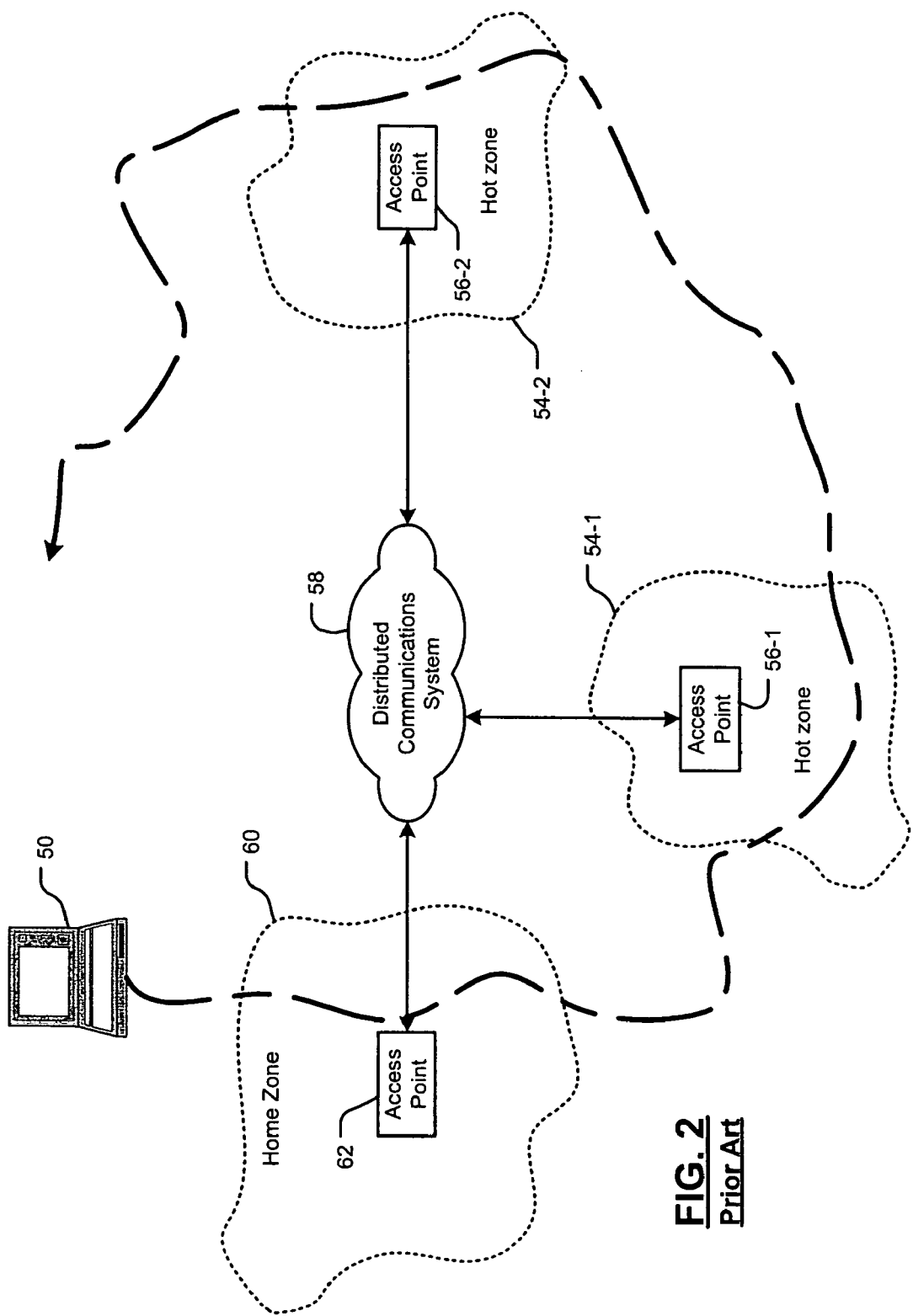
FIG. 2 illustrates a laptop computer as it travels through hot zones according to the prior art.

The following description of the preferred embodiment(s) is merely exemplary in nature and is in no way intended to limit the invention, its application, or uses. For purposes of clarity, the same reference numerals will be used in the drawings to identify similar elements. As used herein, the term module, agent and/or device refers to an application specific integrated circuit (ASIC), an electronic circuit, a software or firmware program, a processor (shared, dedicated, or group) and memory that execute one or more software or firmware programs, a combinational logic circuit, or other suitable components that provide the described functionality.

The present invention provides a novel computer architecture including a low-power secondary processor for operating a secondary display in laptop and desktop computers. The secondary processor dissipates very low power and supports a reduced set of Personal Digital Assistant-like services such as text messaging, e-mail messaging, securities quote retrieval and/or trading, hot zone identification, e-mail notification and the like when the computer is in an inactive mode. The low-power secondary processor and the secondary display are operated when the computer is in the inactive mode. As used herein, the term inactive mode refers to low-power hibernating modes, off modes and/or other modes that do not provide sufficient power to support complex processing and graphics that are normally performed by the primary processor and the primary display of the laptop and desktop computers in the active mode.

Figure 3A:
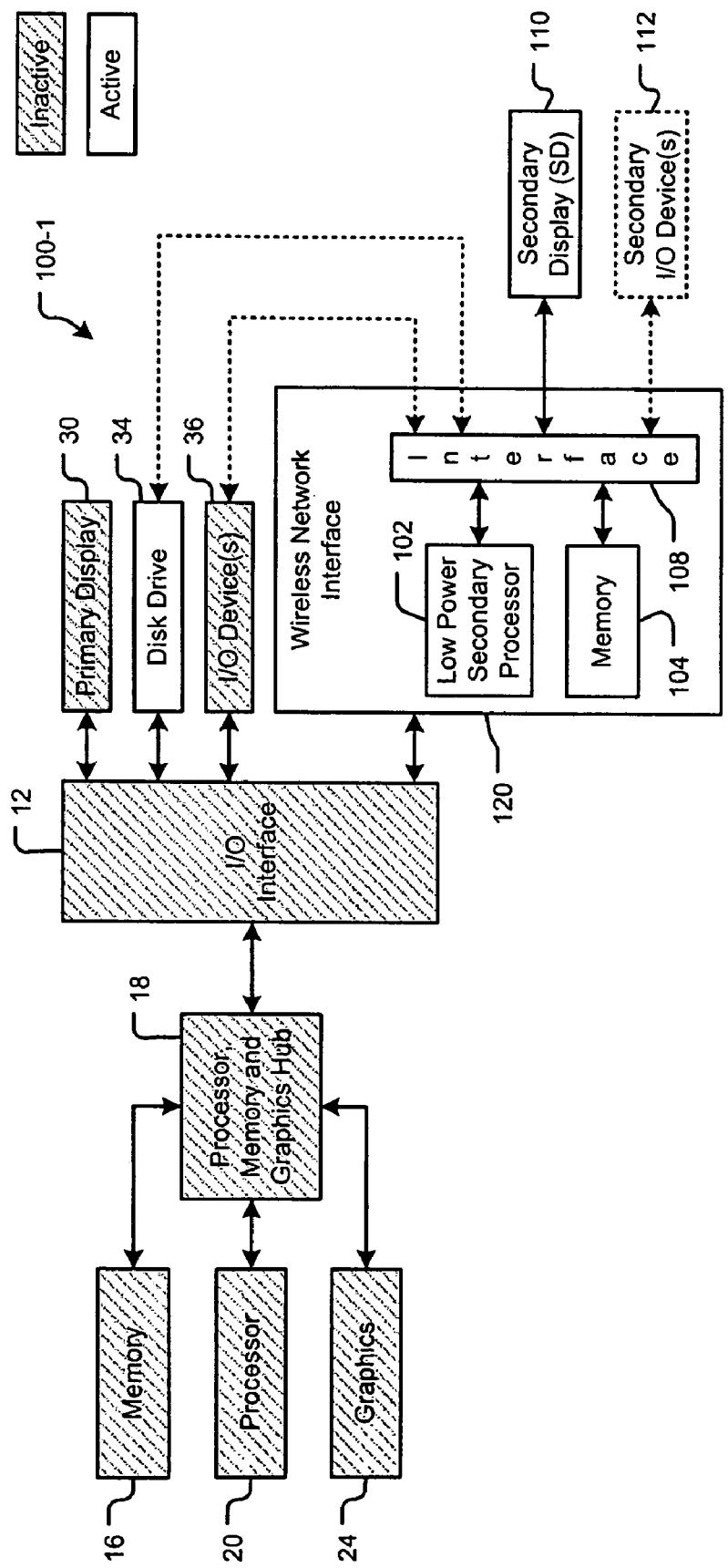
FIG. 3A is a functional block diagram of a first computer architecture for laptop and desktop computers with a secondary processor and a secondary display according to the present invention.

Referring now to FIG. 3A, in addition to the primary components described above in conjunction with FIG. 1, a computer architecture 100-1 according to the present invention further includes a low-power secondary processor 102 and secondary memory 104. The low-power secondary processor 102 and the secondary memory 104 communicate with a secondary input/output interface 108. The secondary memory 104 includes RAM, ROM, Flash, and/or any other type of electronic data storage. As can be appreciated, some or all of the primary memory 16 can be used instead of and/or in addition to the secondary memory 104.

A secondary display 110 communicates with the I/O interface 108 and supports simple graphics such as the display of text, icons and other low resolution graphics. In a preferred embodiment, the secondary display 110 preferably includes a monochrome liquid crystal display (LCD), although a color LCD or other display types may be used. The secondary display 110 may support touch screen functionality. Alternately, one or more secondary input/output devices 112 may be provided such as buttons, touch pads, scratch pads, pointing devices and the like.

In the computer architecture 100-1 that is shown in FIG. 3A, the low-power secondary processor 102, secondary memory 104, and secondary I/O interface 108 are integrated/embedded with a wireless network interface 120. The wireless network interface 120 supports a wireless network such as a wide area network, a local area network, a cellular network such as CDMA, GSM, GSM3G, GPRS systems or other cellular networks, a Bluetooth network, or any other wireless network type. For example, the wireless network interface 38 may be compliant with IEEE Section 802.11, 802.11a, 802.11b, 802.11g, and/or 802.16, which are hereby incorporated by reference in their entirety. In other words, the secondary processor 102 also supports wireless network functionality in addition to the functionality that is described above and that is enabled when the computer is in the inactive mode. Alternatively, the wireless network interface 120 may include another processor that supports wireless network functionality in addition to the secondary processor 102.

Figure 3B:
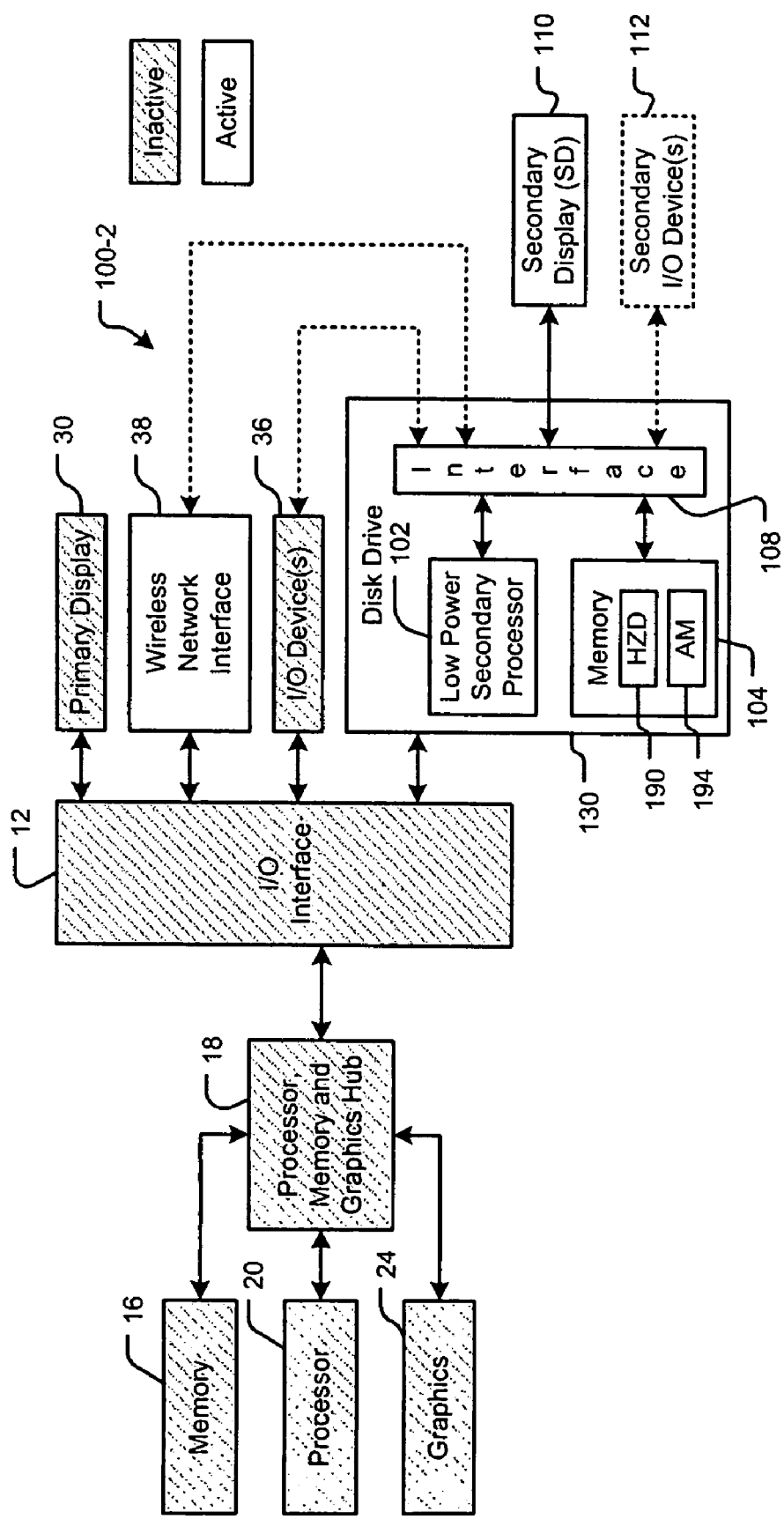
FIG. 3B is a functional block diagram of a second computer architecture for laptop and desktop computers with a secondary processor and a secondary display according to the present invention.

In the computer architecture 100-2 that is shown in FIG. 3B, the low-power secondary processor 102, secondary memory 104, and secondary I/O interface 108 are integrated/embedded with a system on chip (SOC) (including a hard disk drive (HDD) and read channel) of a disk drive system 130. In other words, the secondary processor 102 also supports disk drive functionality in addition to other functionality that is described above and that is enabled when the computer is in the inactive mode. Alternatively, the disk drive system 130 may have dedicated processor in addition to the secondary processor 102.

Figure 3C:
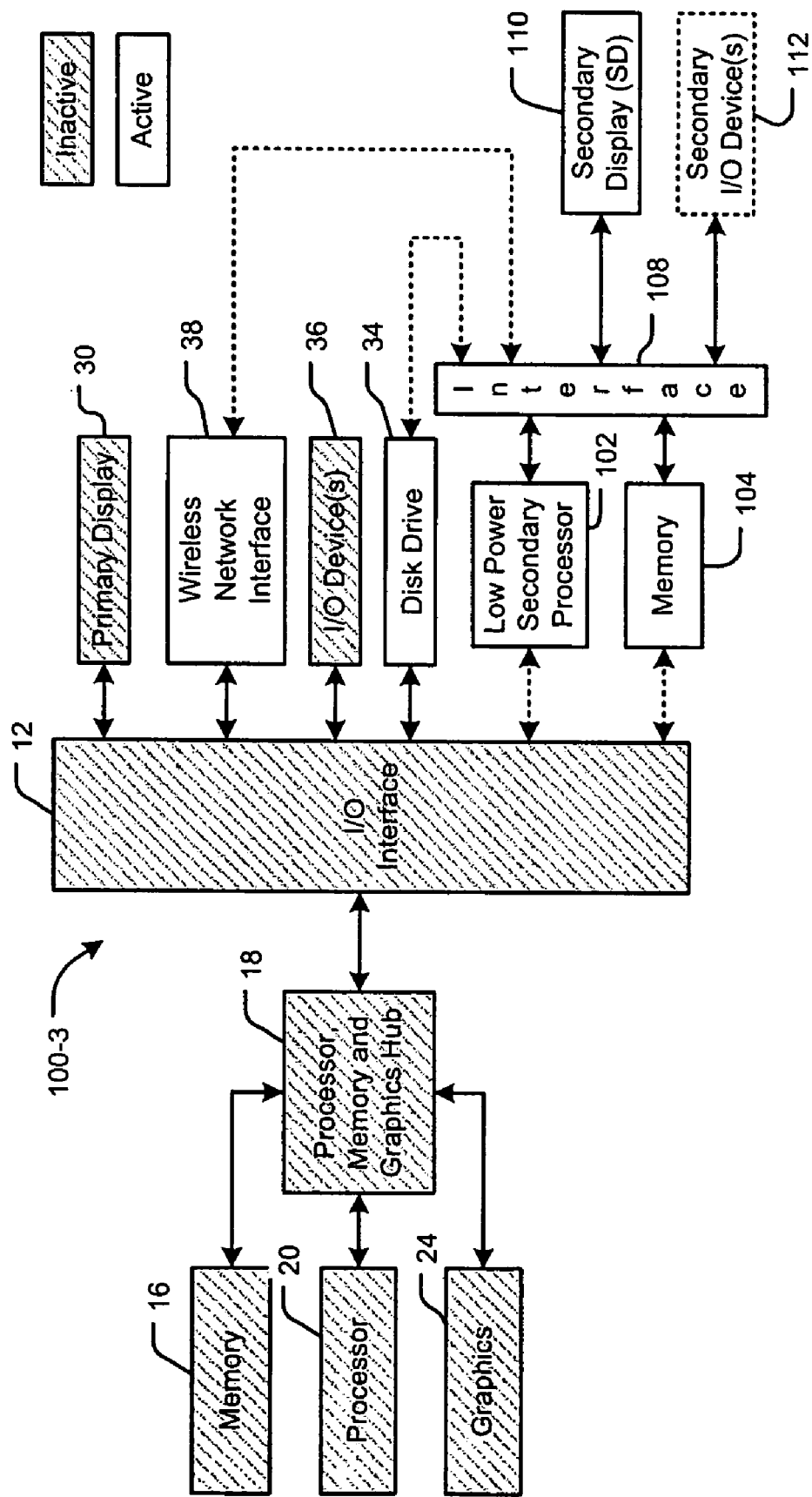
FIG. 3C is a functional block diagram of a third computer architecture for laptop and desktop computers with a secondary processor and a secondary display according to the present invention.

In the computer architecture 100-3 that is shown in FIG. 3C, the low-power secondary processor 102, memory 104, and interface 108 are not embedded in or otherwise integrated with other system components.

In the computer architecture 100-1 that is shown in FIG. 3A, the primary memory 16, primary processor 20, graphics 24, hub 18, and primary display 30 are in the inactive mode.

The wireless network interface 120, low-power secondary processor 102, secondary memory 104, secondary I/O interface 108, secondary display 110, and secondary I/O devices 112 are powered and support the desired reduced functionality. The I/O interface 12 may be either inactive (as shown) or active. The disk drive system 34 may be powered as needed to store and retrieve data or not powered during the inactive mode. If the disk drive system 34 is not powered during the inactive mode, the secondary memory 104 should have a sufficient size to support the desired reduced functionality.

In the computer architecture 100-2 that is shown in FIG. 3B, the primary memory 16, primary processor 20, graphics 24, hub 18, and primary display 30 are inactive. The wireless network interface 120, low-power secondary processor 102, secondary memory 104, secondary I/O interface 108, secondary display 110, disk drive system 34 and secondary I/O devices 112 are powered and support the desired reduced functionality. The I/O interface 12 may be either inactive (as shown) or active.

In the computer architecture 100-3 that is shown in FIG. 3C, the primary memory 16, primary processor 20, graphics 24, hub 18, and primary display 30 are inactive. The wireless network interface 120, low-power secondary processor 102, secondary memory 104, secondary I/O interface 108, secondary display 110, and secondary I/O devices 112 are powered and support the desired reduced functionality. The I/O interface 12 may be either inactive (as shown) or active. The disk drive system 34 may be powered as needed to store and retrieve data or not powered during the inactive mode. If the disk drive system 34 is not powered during the inactive mode, the secondary memory 104 should have a sufficient size to support the desired reduced functionality.

The low-power secondary processors 102 of the computer architectures 100 have sufficient processing power to drive the secondary displays 110. The secondary processors 102 also handle input and output events via the secondary I/O device(s) 112. The secondary processors 102 also preferably execute hot zone detecting (HZD) modules 190 (for example, shown in FIG. 3B) that sense hot zones and generate an icon, text or other visual message on the secondary display 110 to notify the user of the hot zone.

The secondary processors 102 may also execute agent modules 194 (for example, shown in FIG. 3B) that access and retrieve securities quotes, e-mail, and the like from servers that are associated with the distributed communications system. The agent modules 194 may also generate scrolling banners, icons, text or other visual messages on the secondary display 110 using the information that is retrieved. The user may also use the I/O devices 112 and/or touch pad to perform personal digital assistant-like (PDA-like) tasks such as to retrieve and respond to e-mails, to retrieve securities quotes, to perform securities trades, and/or other similar tasks.

Figure 4A:
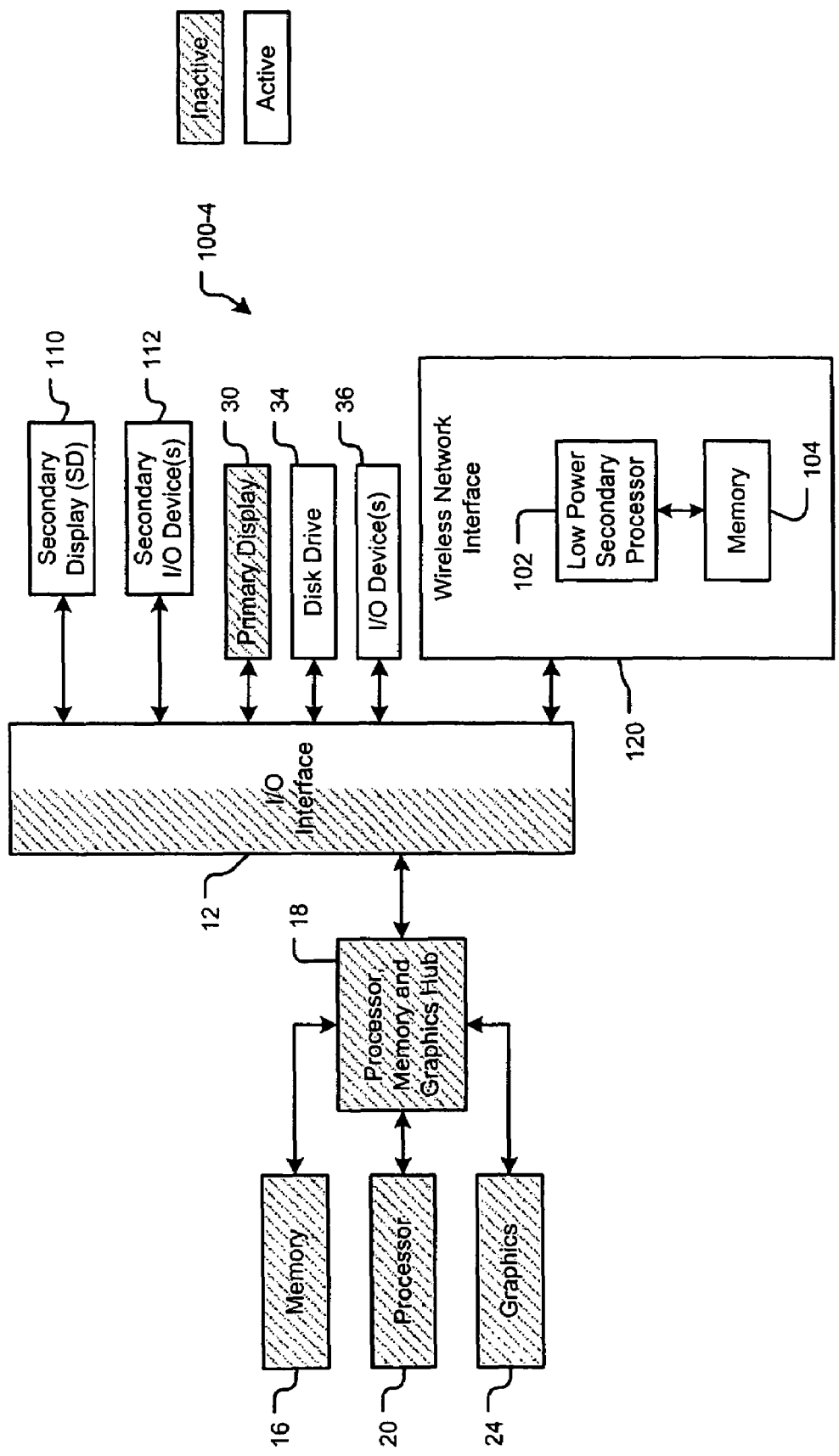
FIG. 4A is a functional block diagram of a fourth computer architecture that is similar to FIG. 3A and that powers the primary I/O interface during the inactive mode according to the present invention.

Referring now to FIG. 4A, instead of using a secondary I/O interface 108 as shown in FIG. 3A during the inactive mode, the computer architecture 110-4 employs the primary I/O interface 12 during the inactive mode. When transitioning to the inactive mode, the primary I/O interface 12 remains fully or at least partially powered so that it can support the secondary functions. The secondary display 110 and the secondary I/O devices 112 communicate with the low power secondary processor 102 and memory 104, which are integrated/embedded with the wireless network interface 120, through the primary I/O interface 12. The disk drive 34 and/or the I/O devices 36 may also be powered during the inactive mode and may communicate with the low power secondary processor 102 and memory 104 through the primary I/O interface 12. If the primary I/O devices 36 are powered, the secondary I/O devices 112 may optionally be omitted. For example, a primary keyboard, mouse and/or other primary I/O device may be used for user interaction during the inactive mode.

Figure 4B:
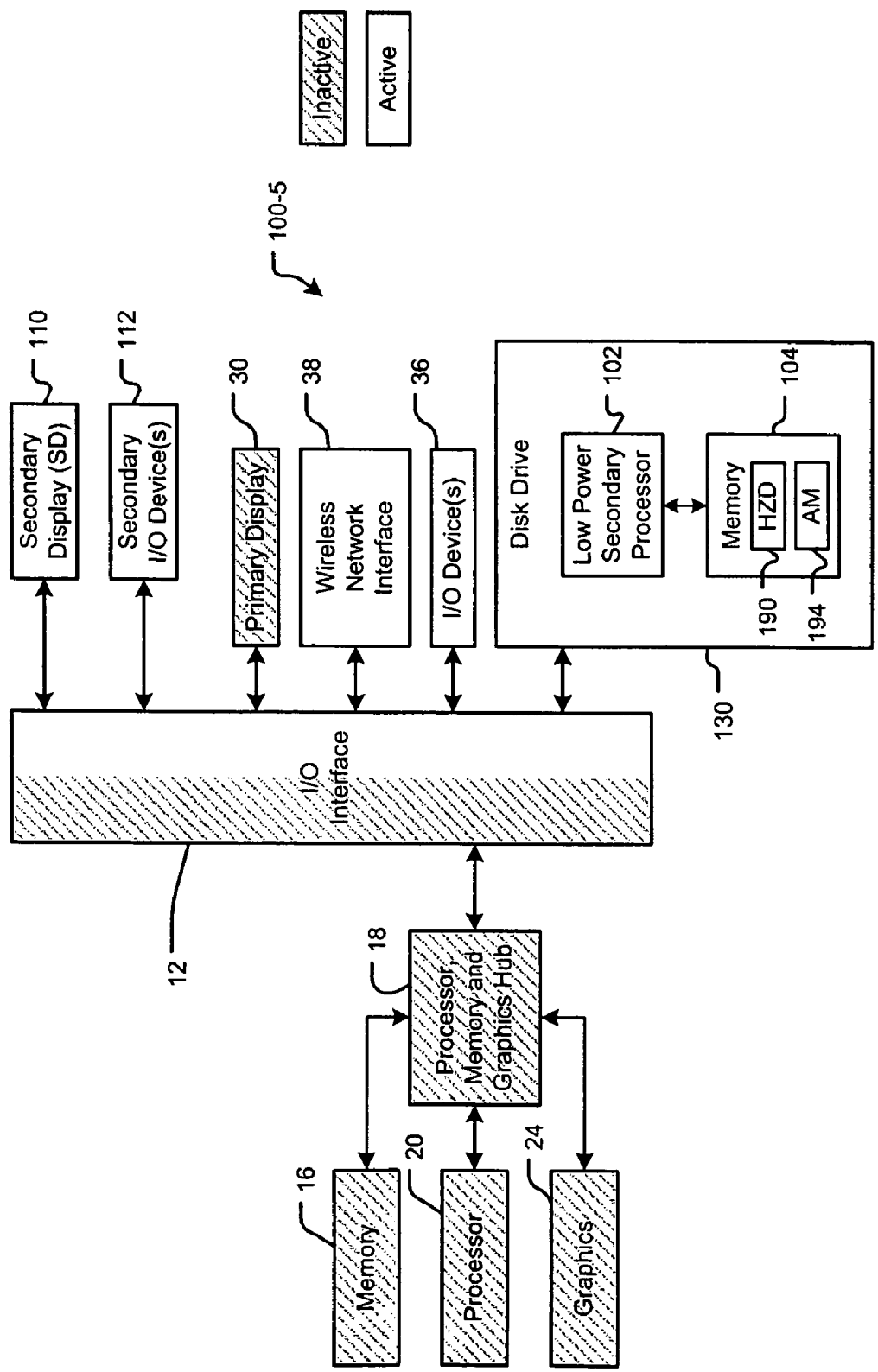
FIG. 4B is a functional block diagram of a fifth computer architecture that is similar to FIG. 3B and that powers the primary I/O interface during the inactive mode according to the present invention.

Referring now to FIG. 4B, instead of using a secondary I/O interface 108 as shown in FIG. 3B during the inactive mode, the computer architecture 110-5 employs the primary I/O interface 12 during the inactive mode. When transitioning to the inactive mode, the primary I/O interface 12 remains fully or at least partially powered so that it can support the secondary functions. The secondary display 110 and the secondary I/O devices 112 communicate with the low power secondary processor 102 and memory 104, which are integrated/embedded with the disk drive 130, through the primary I/O interface 12. The wireless network interface 38 and/or the I/O devices 36 may also be powered during the inactive mode and may communicate with the low power secondary processor 102 and memory 104 through the primary I/O interface 12. If the primary I/O devices 36 are powered, the secondary I/O devices 112 may optionally be omitted. For example, the primary keyboard, mouse and/or other primary I/O device may be used for user interaction during the inactive mode.

Figure 4C:
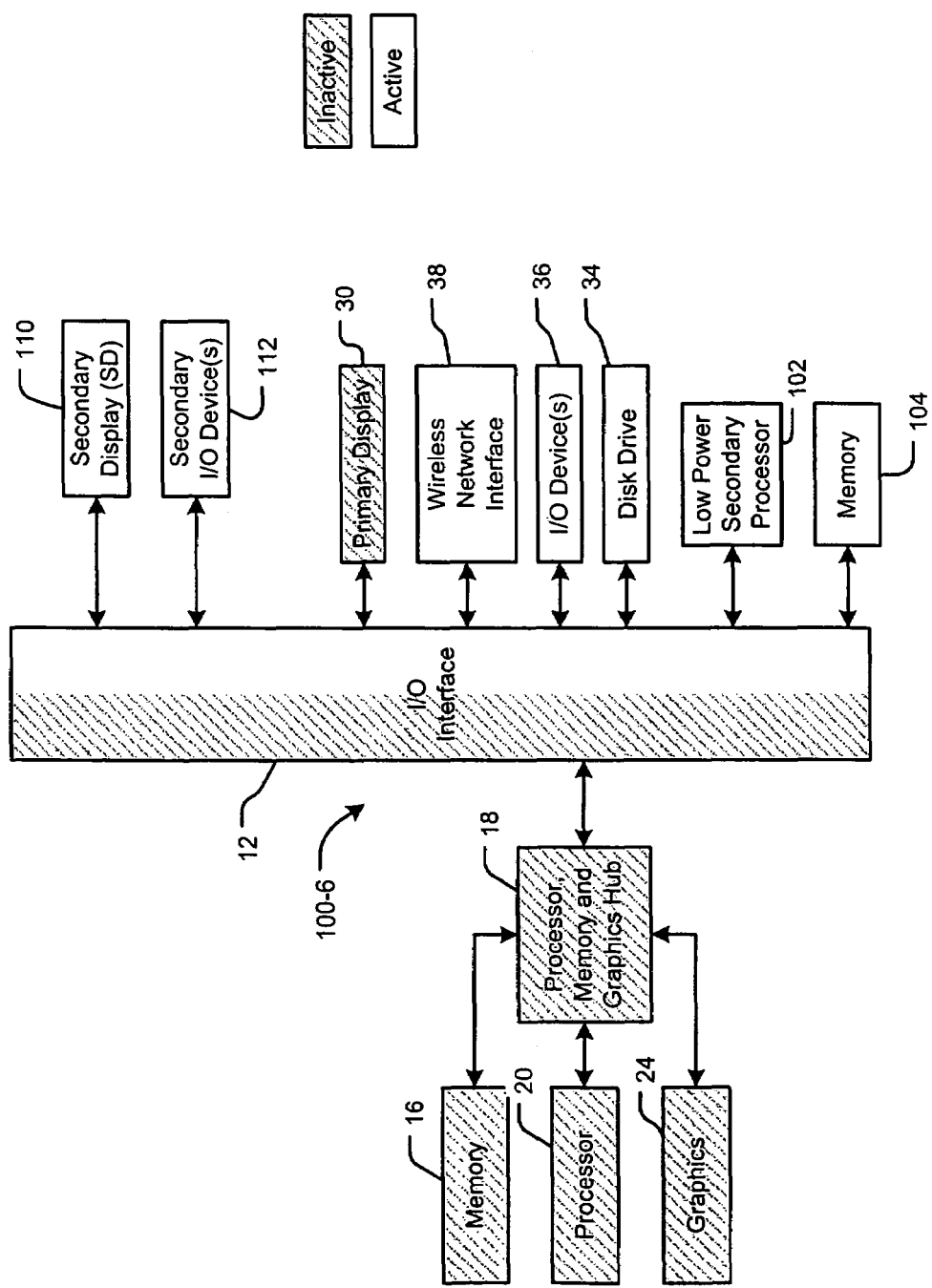
FIG. 4C is a functional block diagram of a sixth computer architecture that is similar to FIG. 3C and that powers the primary I/O interface during the inactive mode according to the present invention.

Referring now to FIG. 4C, instead of using a secondary I/O interface 108 as shown in FIG. 3C during the inactive mode, the computer architecture 110-6 employs the primary I/O interface 12 during the inactive mode. When transitioning to the inactive mode, the primary I/O interface 12 remains fully or at least partially powered so that it can support the secondary functions. The secondary display 110 and the secondary I/O device 112 communicate with the low power secondary processor 102 and memory 104 through the primary I/O interface 12. The disk drive 34, the wireless network interface 38 and/or the I/O devices 36 may also be powered during the inactive mode and may communicate with the low power secondary processor 102 and memory 104 through the primary I/O interface 12. If the primary I/O devices 36 are powered, the secondary I/O devices 112 may optionally be omitted. For example, the primary keyboard, mouse and/or other primary I/O device may be used for user interaction during the inactive mode.

Figure 5A:
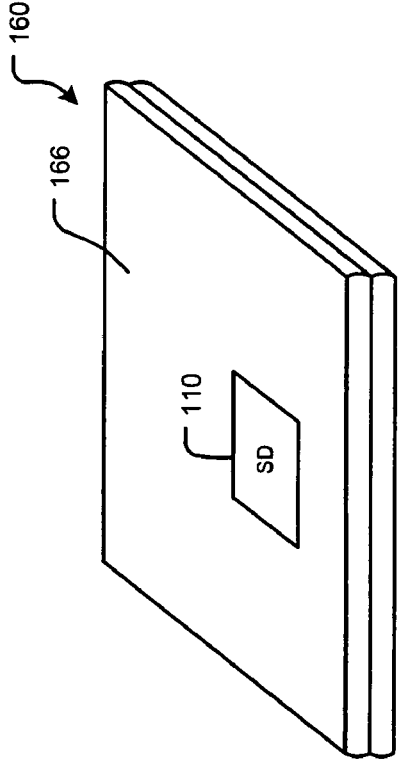
FIG. 5A is a perspective view of a laptop computer including a secondary display according to the present invention.
Figure 5B:
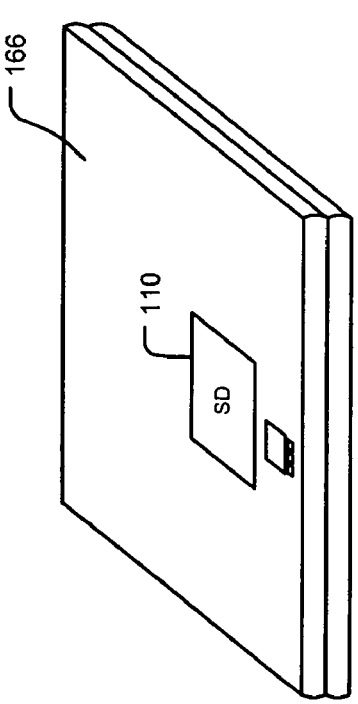
FIG. 5B is a perspective view of a laptop computer including a secondary display and a secondary input/output device according to the present invention.
Figure 5C:
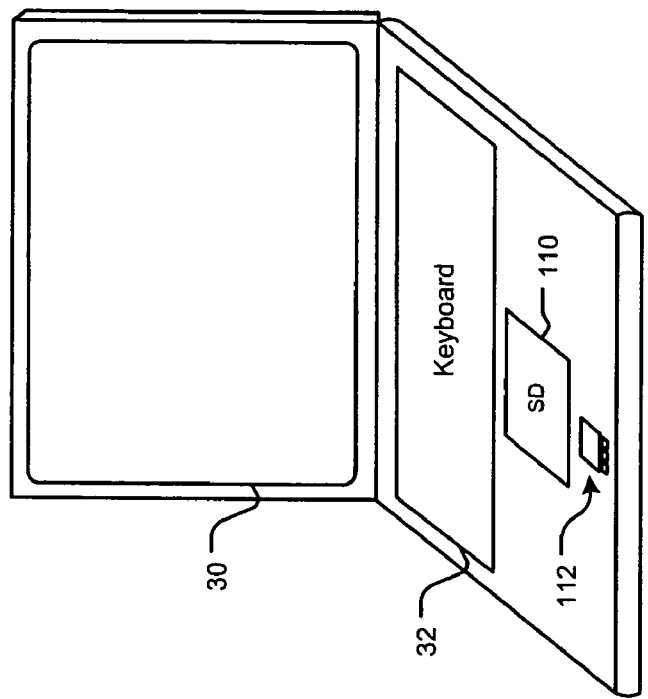
FIG. 5C is a perspective view of a laptop computer including a secondary display mounted inside of the laptop adjacent to the keyboard according to the present invention.

Referring now to FIGS. 5A, 5B and 5C, a laptop computer 160 according to the present invention includes the secondary display 110. For example, the secondary display 110 can be arranged on a top side 166 of the laptop computer 160. Skilled artisans will appreciate that the secondary display 110 may be located in many other locations on the laptop 160 including, but not limited to, the front edges, inside of the laptop adjacent to the keyboard, or in any other suitable location. Referring now to FIG. 5B, secondary I/O devices 170 may be provided such as but not limited to buttons, a scratch pad, a pointing device, a keyboard, a mini key pad, an alphanumeric key pad similar to a telephone and/or other devices. The secondary I/O devices 170 are located adjacent to the secondary display 110. In FIG. 5C, the secondary display 110 is located adjacent to the keyboard on the inside of the laptop. Still other locations will be readily apparent.

Figure 6A:
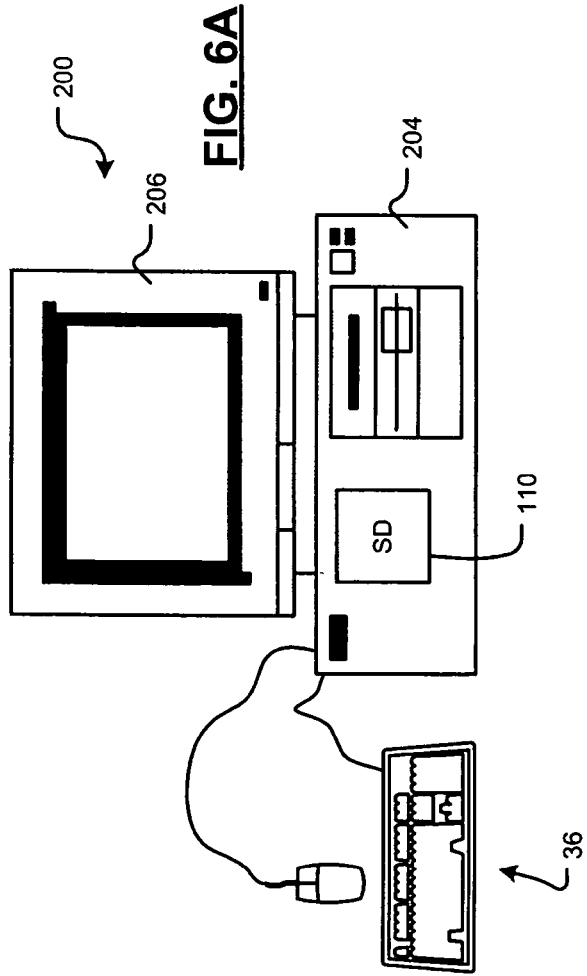
FIG. 6A illustrates a front view of a desktop computer including an integrated secondary display according to the present invention.
Figure 6B:
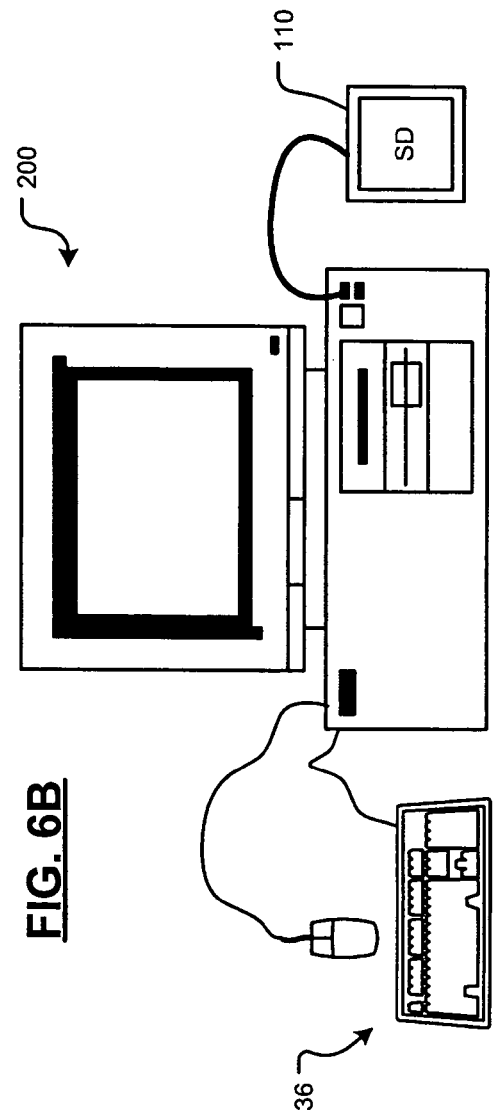
FIG. 6B illustrates a front view of a desktop computer including a peripheral secondary display according to the present invention.

Referring now to FIGS. 6A and 6B, a desktop computer 200 includes the secondary display 110, which can be integrated with a computer enclosure 204 as shown. Skilled artisans will appreciate that there are a variety of other suitable locations on the enclosure 204, the keyboard (or other I/O device) and/or the monitor 206 for the secondary display 110. In FIG. 6B, the secondary display 110 is connected as a peripheral device to the desktop computer 200. The secondary display 110 can also be connected to a laptop computer as a peripheral device as well. In this embodiment, the low power secondary processor 102, the secondary memory 104 and/or the secondary I/O interface 108 may also be associated with the peripheral secondary display 110.

Figure 7:
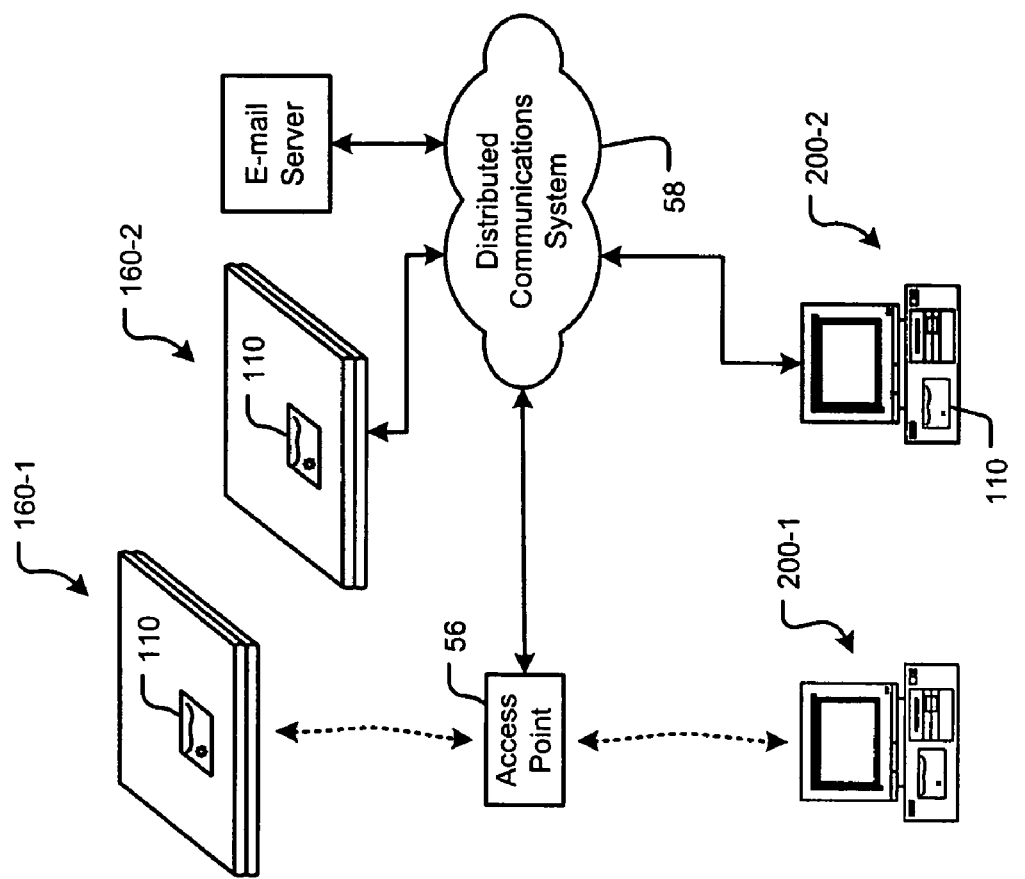
FIG. 7 illustrates laptop and desktop computers with secondary displays that are directly and/or wirelessly connected to a distributed communication system and a server.

Referring now to FIG. 7, the secondary processors 102 and secondary displays 110 that are associated with the laptop and desktop computers can be operated in a network, for example, wirelessly via the access point 56 and/or directly connected to the distributed communications system 58. The secondary processors 102 and secondary displays 110 provide the reduced set of services without requiring the laptop or desktop computer to be booted up.

The secondary display and other components that are operated when the primary components are inactive may be powered by the battery that powers the laptop and/or via a secondary battery (not shown). In one embodiment, the secondary battery is recharged by the main battery during the active mode.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A computer comprising:
    a primary processor;
    primary memory;
    a primary input/output (I/O) interface that communicates with said primary processor and said primary memory;
    a primary display that communicates with said primary I/O interface, wherein said primary processor, said primary memory, and said primary display are operated in active and inactive modes and are powered down when said computer is in said inactive mode;
    a wireless network interface that communicates with said primary I/O interface;
    a secondary processor that is integrated with said wireless network interface and that dissipates less power than said primary processor; and
    a secondary display that communicates with said secondary processor, wherein said secondary processor and said secondary display are powered up when said computer is in said inactive mode, and said secondary processor processes wireless network data in each of said active and inactive modes.

2. The computer of claim 1 further comprising a secondary memory that communicates with said secondary processor, that is powered up when said computer is in said inactive mode and that has a lower storage capacity than said primary memory.

3. The computer of claim 1 wherein said secondary processor and said secondary display support at least one of text messaging, e-mail delivery, securities quote retrieval and hot zone identification while said computer is in said inactive mode.

4. The computer of claim 1 wherein said computer is a laptop and said secondary display is integrated with an outer surface of said laptop.

5. The computer of claim 1 further comprising a secondary I/O device that communicates with said secondary processor.

6. The computer of claim 1 wherein said secondary display supports touch pad operation.

7. The computer of claim 1 wherein said computer is a desktop computer that includes an enclosure and wherein said secondary display is integrated with said enclosure.

8. A system comprising the computer of claim 1 and further comprising:
    a wireless network interface that communicates with said secondary processor;
    a distributed communications system that communicates with said wireless network interface;
    a server that communicates with said distributed communications system; and
    an agent module that is executed by said secondary processor and that retrieves at least one of e-mail messages and securities data from said server.

9. The computer of claim 1 further comprising a hot zone module that is executed by said secondary processor, that identifies when said computer is in a hot zone, and that provides a visual indication of said hot zone on said secondary display.

10. A computer having active and inactive modes, comprising:
    a secondary processor that dissipates less power than a primary processor; and
    a secondary display that communicates with said secondary processor,
    wherein said secondary processor and said secondary display are powered when said computer is in said inactive mode and support at least one of text messaging, e-mail delivery, securities quote retrieval and hot zone identification while said computer is in said inactive mode, and said secondary processor processes wireless network data in each of said active and inactive modes.

11. The computer of claim 10 further comprising a secondary memory that communicates with said secondary processor and that is powered when said computer is in said inactive mode.

12. The computer of claim 10 further comprising:
    the primary processor;
    a primary memory;
    a primary I/O interface that communicates with said primary processor and said primary memory; and
    a primary display that communicates with said primary I/O interface, wherein said primary processor, said primary memory, and said primary display are operated in active and inactive modes and are powered down when said computer is in said inactive mode.

13. The computer of claim 12 further comprising a secondary memory that communicates with said secondary processor, that is powered when said computer is in said inactive mode, and that has a lower storage capacity than said primary memory.

14. The computer of claim 10 wherein said computer is a laptop and said secondary display is integrated with an outer surface of said laptop.

15. The computer of claim 12 further comprising a disk drive system that communicates with said primary I/O interface, wherein said secondary processor is integrated with said disk drive system.

16. The computer of claim 12 further comprising a wireless network interface that communicates with said primary I/O interface, wherein said secondary processor is integrated with said wireless network interface.

17. The computer of claim 10 further comprising a secondary I/O device that communicates with said secondary processor.

18. The computer of claim 10 wherein said secondary display supports touch pad operation.

19. The computer of claim 10 wherein said computer is a desktop computer that includes an enclosure and wherein said secondary display is integrated with said enclosure.

20. A system comprising the computer of claim 10 and further comprising:
- a wireless network interface that communicates with said secondary processor;
- a distributed communications system that communicates with said wireless network interface;
- a server that communicates with said distributed communications system; and
- an agent module that is executed by said secondary processor and that retrieves at least one of e-mail messages and securities data from said server.

21. The computer of claim 12 further comprising a hot zone module that is executed by said secondary processor, that identifies when said computer is in a hot zone, and that provides a visual indication of said hot zone on said secondary display.

22. A computer comprising:
- primary processing means for processing data;
- primary storage means for storing data;
- primary input/output (I/O) interface means for communicating with said primary processing means and said primary storage means;
- primary display means for displaying data and that communicates with said primary I/O interface means, wherein said primary processing means, said primary storage means, and said primary display means are operated in active and inactive modes and are powered down when said computer is in said inactive mode;
- wireless network interface means for providing an interface to a wireless network;
- secondary processing means integrated with said wireless network interface means for processing data and for dissipating less power than said primary processing means; and
- secondary display means for displaying data and that communicates with said secondary processing means, wherein said secondary processing means and said secondary display means are powered up when said computer is in said inactive mode, and said secondary processing means processes wireless network data in each of said active and inactive modes.

23. The computer of claim 22 further comprising secondary storage means that communicates with said secondary processing means, that is powered up when said computer is in said inactive mode and that has a lower storage capacity than said primary storage means.

24. The computer of claim 22 wherein said secondary processing means and said secondary display means support at least one of text messaging, e-mail delivery, securities quote retrieval and hot zone identification while said computer is in said inactive mode.

25. The computer of claim 23 wherein said computer is a laptop and said secondary display means is integrated with an outer surface of said laptop.

26. The computer of claim 22 further comprising secondary I/O means for inputting user data and that communicates with said secondary processing means.

27. The computer of claim 22 wherein said secondary display means supports touch pad operation.

28. The computer of claim 22 wherein said computer is a desktop computer that includes an enclosure and wherein said secondary display means is integrated with said enclosure.

29. A system comprising the computer of claim 22 and further comprising:
- wireless network interface means for providing an interface to a wireless network and that communicates with said secondary processing means;
- a distributed communications system that communicates with said wireless network interface means;
- server means for serving e-mail messages and securities data and that communicates with said distributed communication system; and
- agent means that is executed by said secondary processing means for retrieving at least one of e-mail messages and securities data from said server means.

30. The computer of claim 22 further comprising hot zone means that is executed by said secondary processing means for identifying when said computer is in a hot zone and for providing a visual indication of said hot zone using said secondary display means.

31. A computer having active and inactive modes, comprising:
- secondary processing means for processing data that dissipates less power than a primary processing means; and
- secondary display means for displaying data and that communicates with said secondary processing means,
- wherein said secondary processing means and said secondary display means are powered when said computer is in said inactive mode and support at least one of text messaging, e-mail delivery, securities quote retrieval and hot zone identification while said computer is in said inactive mode, and said secondary processing means processes wireless network data in each of said active and inactive modes.

32. The computer of claim 31 further comprising secondary storage means for storing data wherein said secondary storage means communicates with said secondary processing means and is powered when said computer is in said inactive mode.

33. The computer of claim 31 further comprising:
- the primary processing means for processing data;
- primary storage means for storing data;
- primary I/O interface means for communicating with said primary processing means and said primary storage means; and
- primary display means for displaying data and that communicates with said primary I/O interface means, wherein said primary processing means, said primary storage means and said primary display means are operated in active and inactive modes and are powered down when said computer is in said inactive mode.

34. The computer of claim 33 further comprising secondary storage means for storing data, wherein said secondary storage means communicates with said secondary processing means, is powered when said computer is in said inactive mode, and has a lower storage capacity than said primary storage means.

35. The computer of claim 31 wherein said computer is a laptop and said secondary display means is integrated with an outer surface of said laptop.

36. The computer of claim 33 further comprising disk drive means for storing data on a magnetic medium and that communicates with said primary I/O interface means, wherein said secondary processing means is integrated with said disk drive means.

37. The computer of claim 33 further comprising wireless network interface means for providing an interface to a wireless network and that communicates with said primary I/O interface means, wherein said secondary processing means is integrated with said wireless network interface means.

38. The computer of claim 31 further comprising secondary I/O means for inputting user data and that communicates with said secondary processing means.

39. The computer of claim 31 wherein said secondary display means supports touch pad operation.

40. The computer of claim 31 wherein said computer is a desktop computer that includes an enclosure and wherein said secondary display means is integrated with said enclosure.

41. A system comprising the computer of claim 31 and further comprising:
wireless network interface means for providing an interface to a wireless network and that communicates with said secondary processing means;
a distributed communications system that communicates with said wireless network interface means;
server means for serving at least one of e-mail messages and securities data and that communicates with said distributed communications system; and
agent means that is associated with said secondary storage means for retrieving at least one of e-mail messages and securities data from said server means.

42. The computer of claim 33 further comprising hot zone means that is executed by said secondary processing means, for identifying when said computer is in a hot zone and for providing a visual indication of said hot zone on said secondary display means.

43. A method for operating a computer comprising:
processing data using a primary processor during an active mode;
storing data in primary memory during said active mode;
displaying data using a primary display during said active mode;
powering down said primary processor, said primary memory, and said primary display when said computer is in an inactive mode;
communicating with a wireless network with a wireless network interface;
processing data using a secondary processor that is integrated with said wireless network interface, which dissipates less power than said primary processor, during said inactive mode;
displaying data using a secondary display that communicates with said secondary processor during said inactive mode; and
processing wireless network data in each of said active and inactive modes with said secondary processor.

44. The method of claim 43 further comprising storing data in secondary memory that communicates with said secondary processor, wherein said secondary memory is powered up when said computer is in said inactive mode and has a lower storage capacity than said primary memory.

45. The method of claim 43 further comprising using said secondary processor and said secondary display to support at least one of text messaging, e-mail delivery, securities quote retrieval and hot zone identification while said computer is in said inactive mode.

46. The method of claim 43 wherein said computer is a laptop and further comprising integrating said secondary display with an outer surface of said laptop.

47. The method of claim 44 further comprising integrating said secondary processor and said secondary memory with a disk drive system.

48. The method of claim 44 further comprising integrating said secondary processor and said secondary memory with a wireless network interface.

49. The method of claim 43 further comprising using a secondary I/O device for inputting user data during said inactive mode.

50. The method of claim 43 wherein said secondary display supports touch pad operation.

51. The method of claim 43 wherein said computer is a desktop computer that includes an enclosure and further comprising integrating said secondary display with said enclosure.

52. The method of claim 43 further comprising retrieving at least one of e-mail messages and securities data from a server during said inactive mode.

53. The method of claim 43 further comprising:
identifying when said computer is located in a hot zone; and
providing a visual indication of said identified hot zone on said secondary display.

54. A method for operating a computer having active and inactive modes, comprising:
processing data using a secondary processor that dissipates less power than a primary processor;
displaying data using a secondary display that communicates with said secondary processor;
powering said secondary processor and said secondary display when said computer is in said inactive mode;
supporting at least one of text messaging, e-mail delivery, securities quote retrieval and hot zone identification using said secondary processor and said secondary display while said computer is in said inactive mode; and
processing wireless network data with said secondary processor in each of said active and inactive modes.

55. The method of claim 54 further comprising storing data in secondary memory that communicates with said secondary processor and that is powered when said computer is in said inactive mode.

56. The method of claim 54 further comprising:
processing data using the primary processor when said computer is in said active mode;
storing data using a primary memory when said computer is in said active mode;
displaying data using a primary display; and
powering down said primary processor, said primary memory, and said primary display when said computer is in said inactive mode.

57. The method of claim 56 further comprising storing data in secondary memory that communicates with said secondary processor, that is powered when said computer is in said inactive mode, and that has a lower storage capacity than said primary memory.

58. The method of claim 54 wherein said computer is a laptop and further comprising integrating said secondary display with an outer surface of said laptop.

59. The method of claim 56 further comprising integrating said secondary processor with a disk drive system.

60. The method of claim 56 further comprising integrating said secondary processor with a wireless network interface.

61. The method of claim 54 further comprising inputting user data using a secondary I/O device.

62. The method of claim 54 wherein said secondary display supports touch pad operation.

63. The method of claim 54 wherein said computer is a desktop computer that includes an enclosure and further comprising integrating said secondary display with said enclosure.

64. The method of claim 54 further comprising retrieving at least one of e-mail messages and securities data from a server using said secondary processor and said secondary memory.

65. The method of claim 56 further comprising:
identifying when said computer is located in a hot zone; and
providing a visual indication of said identified hot zone on said secondary display.

66. The computer of claim 1 wherein said secondary processor and said secondary display support PDA-like functionality.

67. The computer of claim 1 wherein said computer is a laptop that includes a keyboard and wherein said secondary display is located inside of said laptop adjacent to said keyboard.

68. The computer of claim 1 wherein said primary I/O interface is powered down during said inactive mode.

69. The computer of claim 1 wherein said primary I/O interface is powered up during said inactive mode.

70. The computer of claim 1 wherein said computer includes a keyboard and a mouse and wherein said primary I/O interface, said keyboard and said mouse are powered up during said inactive mode.

71. The computer of claim 10 wherein said secondary processor and said secondary display support PDA-like functionality.

72. The computer of claim 10 wherein said computer is a laptop that includes a keyboard and wherein said secondary display is located inside of said laptop adjacent to said keyboard.

73. The computer of claim 12 wherein said primary I/O interface is powered down during said inactive mode.

74. The computer of claim 12 wherein said primary I/O interface is powered up during said inactive mode.

75. The computer of claim 12 wherein said computer includes a keyboard and a mouse and wherein said primary I/O interface, said keyboard and said mouse are powered up during said inactive mode.

76. The computer of claim 22 wherein said secondary processing means and said secondary display means support PDA-like functionality.

77. The computer of claim 22 wherein said computer is a laptop that includes a keyboard and wherein said secondary display means is located inside of said laptop adjacent to said keyboard.

78. The computer of claim 22 wherein said primary I/O interface means is powered down during said inactive mode.

79. The computer of claim 22 wherein said primary I/O interface means is powered during said inactive mode.

80. The computer of claim 22 wherein said computer includes a keyboard and a mouse and wherein said primary I/O interface means, said keyboard and said mouse are powered during said inactive mode.

81. The computer of claim 31 wherein said secondary processing means and said secondary display means support PDA-like functionality.

82. The computer of claim 31 wherein said computer is a laptop that includes a keyboard and wherein said secondary display means is located inside of said laptop adjacent to said keyboard.

83. The computer of claim 33 wherein said primary I/O interface means is powered up down during said inactive mode.

84. The computer of claim 33 wherein said primary I/O interface means is powered during said inactive mode.

85. The computer of claim 33 wherein said computer includes a keyboard and a mouse and wherein said primary I/O interface means, said keyboard and said mouse are powered during said inactive mode.

86. The method of claim 43 wherein said secondary processor and said secondary display support PDA-like functionality.

87. The method of claim 43 wherein said computer is a laptop that includes a keyboard and further comprising locating said secondary display inside of said laptop adjacent to said keyboard.

88. The method of claim 43 wherein said computer includes a primary I/O interface and further comprising powering down said primary I/O interface during said inactive mode.

89. The method of claim 43 wherein said computer includes a primary I/O interface and further comprising powering said primary I/O interface during said inactive mode.

90. The method of claim 43 wherein said computer includes a primary I/O interface, a keyboard and a mouse and further comprising powering said primary I/O interface, said keyboard and said mouse during said inactive mode.

91. The method of claim 54 wherein said secondary processor and said secondary memory display PDA-like functionality.

92. The method of claim 54 wherein said computer is a laptop that includes a keyboard and wherein said secondary display is located inside of said laptop adjacent to said keyboard.

93. The method of claim 54 wherein said computer includes a primary I/O interface and further comprising powering down said primary I/O interface during said inactive mode.

94. The method of claim 54 wherein said computer includes a primary I/O interface and further comprising powering said primary I/O interface during said inactive mode.

95. The method of claim 54 wherein said computer includes a primary I/O interface, a keyboard and a mouse and further comprising powering said primary I/O interface, said keyboard and said mouse during said inactive mode.

\* \* \* \* \*

UNITED STATES PATENT AND TRADEMARK OFFICE
CERTIFICATE OF CORRECTION

| | | |
|---|---|---|
| PATENT NO. | : 7,421,602 B2 | Page 1 of 1 |
| APPLICATION NO. | : 10/779544 | |
| DATED | : September 2, 2008 | |
| INVENTOR(S) | : Sehat Sutardja | |

It is certified that error appears in the above-identified patent and that said Letters Patent is hereby corrected as shown below:

Column 14, Line 6    Delete "up down" and insert -- up/down --

Signed and Sealed this

Twenty-first Day of October, 2008

JON W. DUDAS
*Director of the United States Patent and Trademark Office*